(12) United States Patent
Farrell, III et al.

(10) Patent No.: US 8,549,801 B1
(45) Date of Patent: Oct. 8, 2013

(54) ENERGY-EFFICIENT DWELLINGS

(76) Inventors: James J. Farrell, III, Austin, TX (US);
Paul Bleck, Kailua Kona, HI (US)

( * ) Notice: Subject to any disclaimer, the term of this patent is extended or adjusted under 35 U.S.C. 154(b) by 394 days.

(21) Appl. No.: 12/928,391

(22) Filed: Dec. 11, 2010

(51) Int. Cl.
*E04D 13/18* (2006.01)

(52) U.S. Cl.
USPC .......................................... 52/173.3; 136/244

(58) Field of Classification Search
USPC ........................................ 52/173.3; 136/244
See application file for complete search history.

(56) References Cited

U.S. PATENT DOCUMENTS

| | | | | |
|---|---|---|---|---|
| 4,054,246 A | * | 10/1977 | Johnson ........................ | 126/620 |
| 4,089,142 A | * | 5/1978 | Kachadorian ................. | 237/1 R |
| 4,090,062 A | * | 5/1978 | Phillips et al. ................ | 219/486 |
| 4,163,218 A | * | 7/1979 | Wu ............................ | 340/12.15 |
| 4,321,416 A | * | 3/1982 | Tennant ........................ | 136/244 |
| 4,400,244 A | * | 8/1983 | Kroger et al. .................. | 205/50 |
| 4,505,325 A | * | 3/1985 | Bergeron, Jr. .................. | 165/45 |
| 5,217,000 A | * | 6/1993 | Pierce-Bjorklund ......... | 126/621 |
| 5,232,518 A | * | 8/1993 | Nath et al. .................... | 136/251 |
| 5,621,662 A | * | 4/1997 | Humphries et al. .......... | 700/276 |
| 5,851,309 A | * | 12/1998 | Kousa ........................... | 136/248 |
| 6,268,559 B1 | * | 7/2001 | Yamawaki ..................... | 136/244 |
| 6,515,215 B1 | * | 2/2003 | Mimura ......................... | 136/244 |
| 6,606,830 B2 | * | 8/2003 | Nagao et al. .................. | 52/173.3 |
| 6,784,361 B2 | * | 8/2004 | Carlson et al. ................ | 136/258 |
| 6,979,771 B2 | * | 12/2005 | Mimura ......................... | 136/244 |
| 7,224,131 B2 | * | 5/2007 | Wilhelm ........................ | 315/312 |
| 7,342,171 B2 | * | 3/2008 | Khouri et al. ................. | 136/245 |
| 7,654,073 B2 | * | 2/2010 | Primlani .................... | 60/39.183 |
| 7,823,337 B2 | * | 11/2010 | Pope ................................ | 52/67 |
| 2001/0034982 A1 | * | 11/2001 | Nagao et al. .................. | 52/173.3 |
| 2006/0271695 A1 | * | 11/2006 | Lavian ........................... | 709/229 |
| 2008/0034681 A1 | * | 2/2008 | McDonald ..................... | 52/93.1 |
| 2010/0065108 A1 | * | 3/2010 | West et al. .................... | 136/251 |
| 2010/0224234 A1 | * | 9/2010 | Fischer ......................... | 136/248 |

\* cited by examiner

*Primary Examiner* — Basil Katcheves
*Assistant Examiner* — Joshua Ihezie
(74) *Attorney, Agent, or Firm* — Chris Whewell (57) ABSTRACT

Dwellings made from energy-efficient, environmentally-friendly materials, and having optional provision for storing and charging an electric vehicle. Dwellings according to some embodiments comprise a backbone cable having a microprocessor attached thereto, as well as a plurality of functional devices in communication with the microprocessor via the backbone cable. A plurality of photovoltaic panels are present on the roof of the dwelling in some embodiments, and the power generated by the photovoltaic panels is sufficient to completely, or nearly-completely, supply all electrical power needs for the dwelling. Financing methods are also provided.

12 Claims, 6 Drawing Sheets

ENERGY-EFFICIENT DWELLINGS

TECHNICAL FIELD

This invention relates generally to architectural structures. More particularly, it relates to dwellings suitable as residential dwellings and commercial dwellings, which are totally energy independent and which have heretofore unseen synergisms resulting from their combination of functional features as provided herein.

BACKGROUND OF THE INVENTION

The present housing market in the United States has several well-known problems, the most basic problem being the low retained-value of homes in general. New dwellings including homes are often sold based on their perceived or speculative value and when demand decreases, the value and selling price of dwellings can decrease dramatically. Many current builders construct houses to the absolute minimum standards in their geographical area. Only minimal security and communications features are employed, and the use of advanced building materials are frequently avoided due to their cost. Such homes quickly become out-of-date.

SUMMARY OF THE INVENTION

Dwellings, in some embodiments comprising a plurality of exterior walls, each of which walls have a bottom portion and a top portion, the exterior walls collectively defining a the perimeter of the dwelling. The top portions of the walls are substantially on the same plane so as to define a horizontal, and there is a roof disposed upon and attached to the top portion of the walls. In some embodiments the roof comprises four planar surfaces. The roof has a pitch that forms an angle with respect to the horizontal, the angle being any angle in the range of between about fifteen degrees and about thirty degrees, which angle is selected based on geographical latitude. There are a plurality of photovoltaic panels attached to or present on the roof, the photovoltaic panels having an output that provides a source of DC electricity. There are a plurality of interior walls, configured to define separate rooms within the dwelling. A backbone cable is present within the dwelling, the backbone cable having a plurality of branches, and each of the branches have an end that is accessible in at least two of the separate rooms. There are a plurality of functional devices, comprising independently at least any two devices selected from the group consisting of: an outside weather station, a fire alarm system, a security alarm system, a power inverter, a climate control system, motion sensors, temperature sensors, a telephone system, dwelling lighting, an entertainment system, and a DC to AC current inverter. The functional devices are connected to and are in electrical communication with the backbone cable. The functional devices are configured to receive inputs from, and optionally provide outputs to, the backbone cable. There is a microprocessor having input and output ports, which microprocessor is connected to the backbone cable in effective electrical communication therewith. The microprocessor is configured to receive inputs and provide outputs to the backbone cable, and hence to the functional devices. In some embodiments, all of the aforesaid functional devices are present. In other embodiments, any one or more than one functional device is independently omitted, in any combination.

BRIEF DESCRIPTION OF THE DRAWINGS

Embodiments of the invention may take physical form in certain parts and arrangement of elements and/or components, the preferred embodiment of which will be described in detail and illustrated in the accompanying drawings which form a part hereof, and wherein.

DETAILED DESCRIPTION

Figure 1:
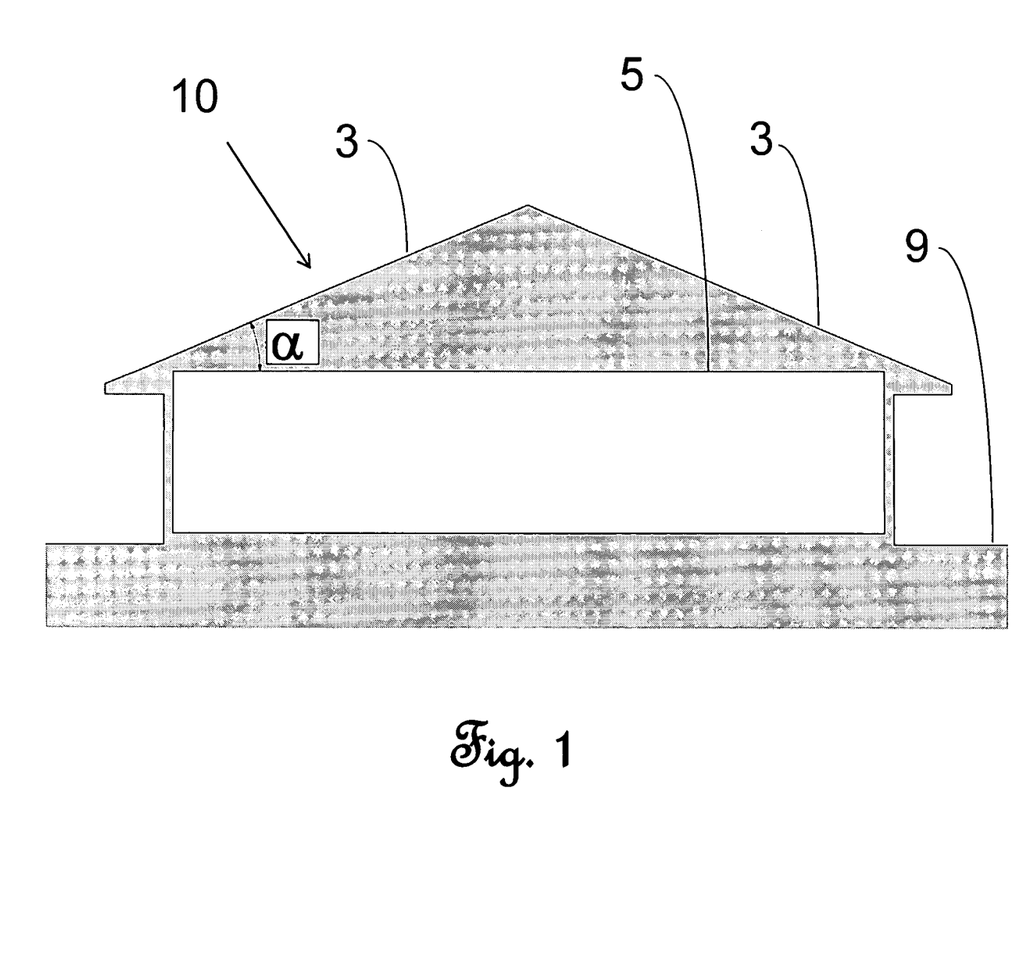
FIG. 1 is a schematic side view of a dwelling according to one embodiment of the disclosure.

Referring now to the drawings, wherein the showings are for the purpose of illustrating the invention only and not for the purpose of limiting the same, FIG. 1 is a schematic side view of a dwelling 10 according to one embodiment of the disclosure. In this FIG. 1 is shown the angle alpha ($\alpha$), which represents the pitch angle that the roof surface 3 makes when intersecting a horizontal 5, which horizontal is substantially parallel to the ground surface 9 upon which dwelling 10 is disposed. In some embodiments, the horizontal 5 is normal to a vertical line passing through the earth's center and dwelling 10. In a dwelling 10 according to the disclosure, angle alpha ($\alpha$) is selected by the builder of the dwelling to be any angle between about fifteen degrees and about thirty degrees, including all angles therebetween. In some embodiments the angle alpha ($\alpha$) is selected based on the geographical location of dwelling 10, according to the following formula:

$$\text{angle alpha } (\alpha) = [(\text{Latitude on Earth's surface}) \times 0.75] + 3 \text{ degrees}$$

In some embodiments, a dwelling according to the disclosure is positioned geographically to achieve maximum solar power collection efficiency, this entails positioning the dwelling's lot and dwelling to maximize exposure to the sun's rays.

In some embodiments, the roof of a dwelling according to the disclosure is factory-manufactured, to accommodate photovoltaic panels. Aspects of the factory-manufactured roof include: steel, wood or similar robust construction material that can both support the photovoltaic panels and which do not contribute any undesirable materials, chemicals or particulates.

Figure 2:
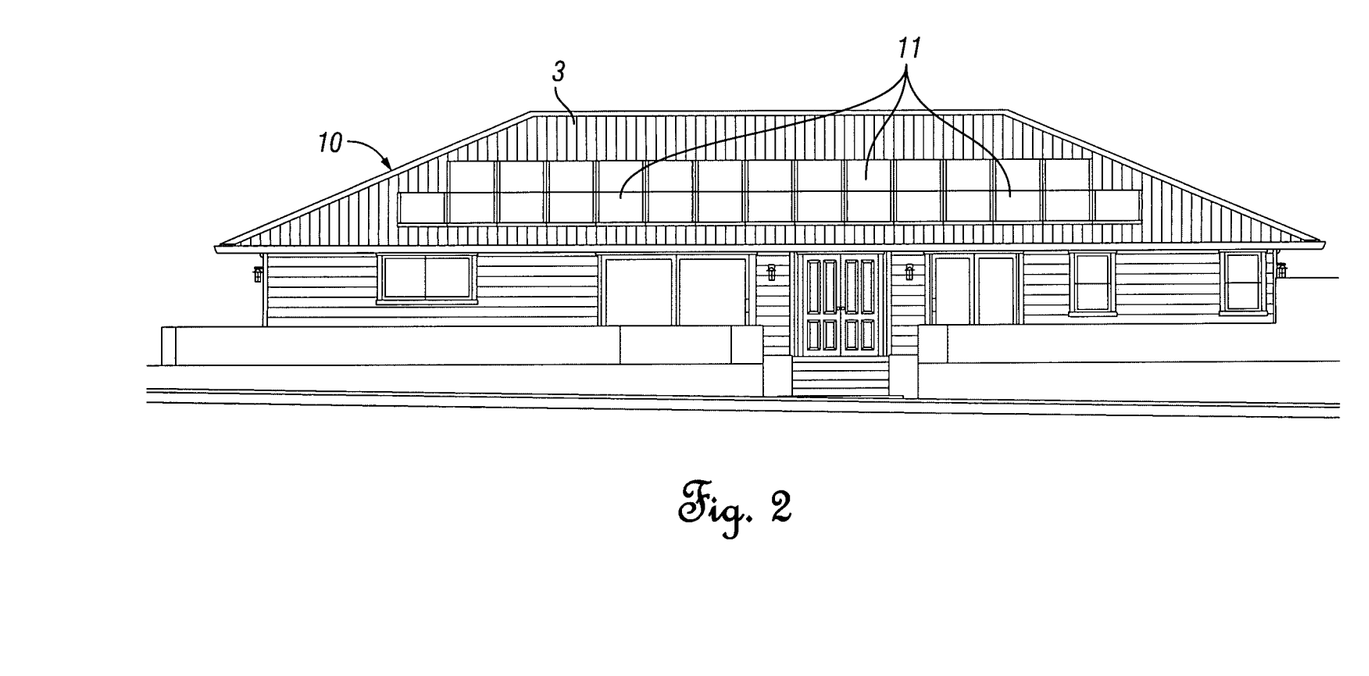
FIG. 2 shows a perspective view of a dwelling according to one embodiment of the disclosure.

In some embodiments, structural components of a dwelling according to the disclosure are manufactured at a location other than the site at which the dwelling is to be constructed. Such structural components include: the roof, the walls, structural supports, plumbing, electrical components including wiring, receptacles and accessories, and structural cable. FIG. 2 shows a perspective view of a dwelling 10 according to one embodiment of the disclosure, having a plurality of photovoltaic panels 11 disposed on roof surface 3, for the purpose of generating electricity from ambient solar irradiation. In a dwelling according to the disclosure, photovoltaic panels 11 are connected to one another either in series, or in parallel, or a combination of series and parallel, as selected or desired. A dwelling 10 according to embodiments of this disclosure includes photovoltaic panels disposed on its roof surface, and the photovoltaic panels can be any type of photovoltaic panels selected from the group consisting of: silicon-based photovoltaic cells, crystalline photovoltaic cells, amorphous photovoltaic cells, and any other known photovoltaic cells. In some embodiments, the photovoltaic panels are 225 watt panels available from Mitsubishi under the trade designation of PV UJ225GA6, which have a solar conversion efficiency of about 18%.

Regardless of whichever type of photovoltaic cells are selected to be disposed on roof surface 3 of a dwelling 10 according to this disclosure, the power output of the photovoltaic cells is fed to a current inverter which converts the direct current output of the photovoltaic cells into an alternating current ("AC") at a desired frequency, which is typically in the range of between about 50 Hertz and about 60 Hertz. The inverter, photovoltaic panels 11, and its associated wiring, switches, relays, electrical storage batteries (when selected to be present) and hardware collectively comprise a photovoltaic system.

The inverter used in some embodiments of a dwelling according to the disclosure is a "grid-tie" inverter, which, subsequent to conversion of the output of the photovoltaic cells to AC, sends the power output to an area-wide "grid" of a power company. Power companies are well known and typically generate electricity from, inter alia, nuclear sources, and coal-fired turbine dynamos. Power companies transmit electricity by means of a "grid" to users in their service area, which users include commercial and residential users, such grids being well-known in the art.

One grid-tie inverter useful in combination with a dwelling according to the disclosure is the Sunny Boy 6000-US™ inverter, available from SMA Solar Technology AG of Niestetal Germany and its US entity SMA America LLC. Another grid-tie inverter useful in combination with a dwelling according to the disclosure is the Sunny Boy 8000-US™ inverter, available from SMA Solar Technology AG of Niestetal Germany and its US entity SMA America LLC. Another grid-tie inverter useful in combination with a dwelling according to the disclosure is the Fronius IG Plus 7.5-1 Uni™ inverter, available from Fronius USA LLC of Brighton Mich. of Fronius Deutschland GmbH of Neuhof-Dorfbom Germany.

In some embodiments of a dwelling according to the disclosure, the power output of the photovoltaic cells is directed to an inverter for conversion of the direct current output of the photovoltaic cells into AC, and the inverter employed is not a grid-tie inverter. Suitable inverters are well-known in the art and, as with grid-tie inverters, are available in a wide range of power-handling capabilities. In such embodiments, provision for storing electricity is made, which provision for storing includes electrical storage batteries which are of any known type, including without limitation: lead-acid storage batteries, lithium batteries, nickel-cadmium batteries, and any other known electrical storage batteries. Optionally, the dwelling includes a backup electrical generator on the premise at which it is located, which backup electrical generator is powered by a hydrocarbon fuel source.

In some embodiments of a dwelling according to the disclosure, both a grid-tie and a non-grid-tie inverter are employed, to enable an occupant or other person to choose whether or not to send electric power to a power grid of a power company. In some embodiments, the output of an inverter present on a dwelling provided by the disclosure is fed to the electrical wiring of the dwelling, which includes standard electrical wall-outlets, and hard-wired (those not equipped with a detatchable electrical plug) fixtures such as ovens and lighting fixtures. In one embodiment of a dwelling according to the disclosure, a grid-tie inverter is employed, having a capacity of 4 kilowatts. In this embodiment, the dwelling is a residential dwelling and a gaseous hydrocarbon (propane or natural gas) is employed for cooking, water heating, heating and clothes drying. In an alternate version of this embodiment, a solar water heating system is additionally present for providing heated water for its normal end-uses. Whether a grid-tie inverter, a non-grid-tie inverter, or both, are selected to be employed in a dwelling according to the disclosure, such inverters (independently, when both types are selected to be present) have a power-handling capability of any amount of power in the range of between about four kilowatts and about 10 kilowatts, including all power-handling capabilities and ranges of power-handling capabilities therebetween.

A dwelling according to some embodiments of this disclosure does not employ incandescent lighting for its lighting requirements but rather employs compact fluorescent lamps. A dwelling according to some embodiments of this disclosure employs light emitting diode ("LED") lamps. A dwelling according to some embodiments of this disclosure employs both light emitting diode ("LED") lamps and compact fluorescent lamps. A dwelling according to some embodiments of this disclosure includes typical appliances, including without limitation: a clothes washer, a clothes dryer, a refrigerator, a dishwasher, water heater, heat pump, water catchment pump, air conditioning system, home office equipment, entertainment system equipment, kitchen appliances, and any other known domestic appliances, devices or equipment. According to some embodiments of the disclosure, the appliances present in a dwelling according to the disclosure are Energy Star compliant, Energy Star being a program created by the United States Environmental Protection Agency in the early 1990's. According to some embodiments of the disclosure, all appliances present in a dwelling according to the disclosure are Energy Star compliant.

In some embodiments, a dwelling according to the disclosure is constructed only from sustainable materials. Within this context, "sustainable" means not manufactured from endangered species of trees or toxic materials, as well as materials generally acceptable to recognized government and non-governmental environment groups.

In some embodiments, a dwelling according to the disclosure is constructed using energy efficient building materials. Within this context, "energy efficient building materials" means materials that will allow for a dwelling according to the disclosure to be heated and cooled at minimal cost.

In some embodiments, a dwelling according to the disclosure is constructed using energy efficient techniques. Within this context, "energy efficient techniques" means thorough state-of-the-art insulating techniques and materials.

In some embodiments, a dwelling according to the disclosure includes a water catchment system. Within this context, a "water catchment system" means capturing rainwater that falls onto and from the roof of a dwelling according to the disclosure and transporting it via efficient gutter sand downspouts to a storage cistern for storage and later use. A cistern when present is configured to receive, store, and deliver rainwater to the dwelling for normal water usage purposes.

In some embodiments, a dwelling according to the disclosure includes environmental waste disposal options. Within this context, "environmental waste disposal options" means a septic system or cesspool that naturally processes waste material to render it minimally harmful to the environment.

Figure 3:
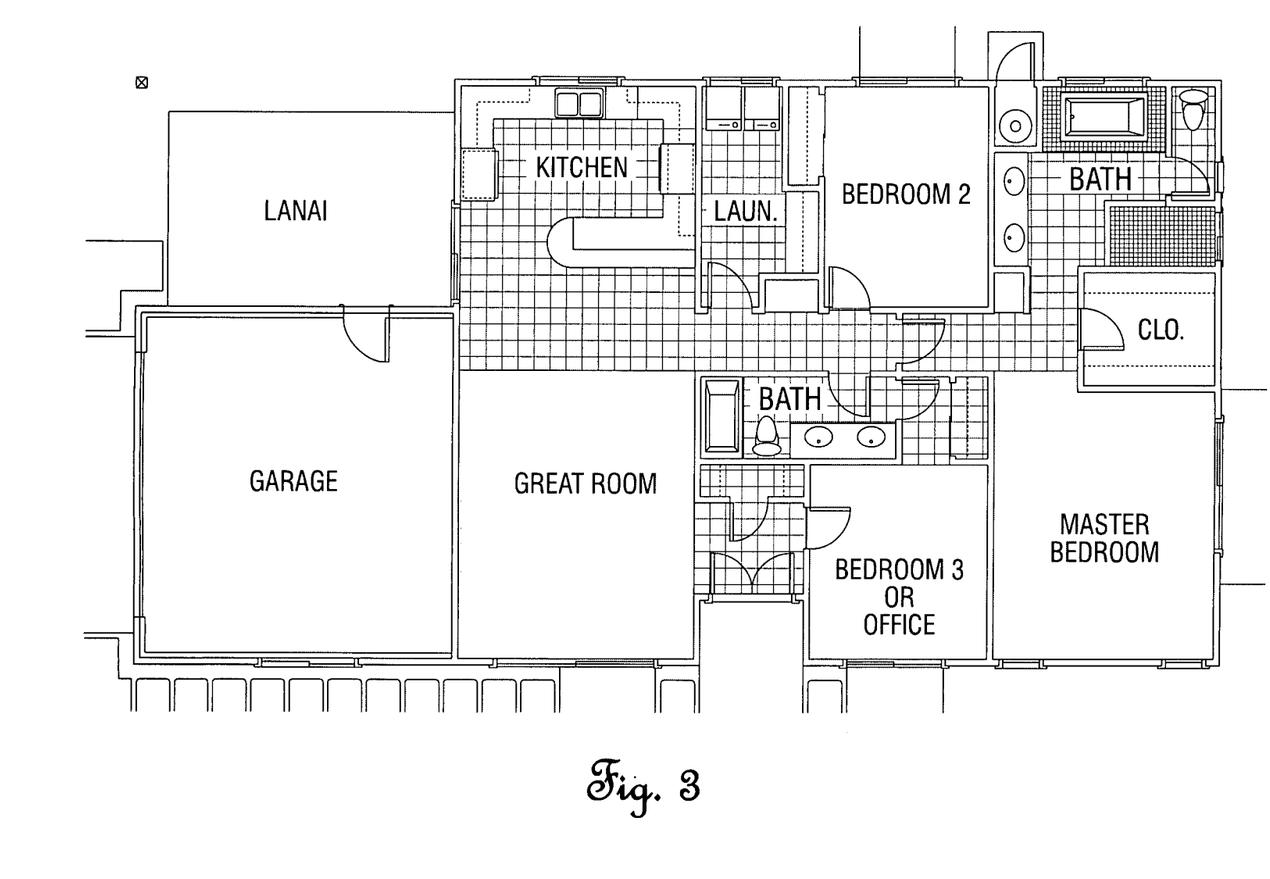
FIG. 3 is an overhead view of a floor plan of a dwelling according to one embodiment of the disclosure.

FIG. 3 is an overhead view of a floor plan of a dwelling 10 according to one embodiment of the disclosure. One unique aspect of a floor plan according to this embodiment is efficient use of floor space and energy efficiency. Another unique aspect of a floor plan according to this embodiment is its support of a factory-manufactured dwelling. Another unique aspect of a floor plan according to this embodiment is its disassembled ability to be transported from the factory to its building site.

A dwelling according to this disclosure can comprise any number of levels or "stories" as they are referred to by persons of ordinary skill in the art. In some embodiments, the dwelling is intended to be used as a residence, and is a single-story dwelling. In some embodiments, the dwelling is intended to be used as a residence, and is a two-story dwelling.

A dwelling according to some embodiments of the disclosure includes a garage space capable of housing an automobile which is at least partially propelled by electricity. In some embodiments, the automobile is powered solely by electricity. The garage space is provided with a charging station in the immediate vicinity of the garage space at which the electric vehicle is to be stored when not in use. Such charging station optionally includes: a dedicated 240 VAC, 40 Ampere outlet option or a dedicated 240 VAC 20 Ampere outlet option. In some embodiments, the charging station includes a US Department of Energy "EnergyCS Level 2" system, level 2 being defined by the Electric Power Research Institute and codified in the National Electric Code. In some embodiments, the electric vehicle is a Mitsubishi I MiEV electric vehicle. However, the present disclosure includes the use of any vehicles which are propelled solely by electricity.

Figure 4:
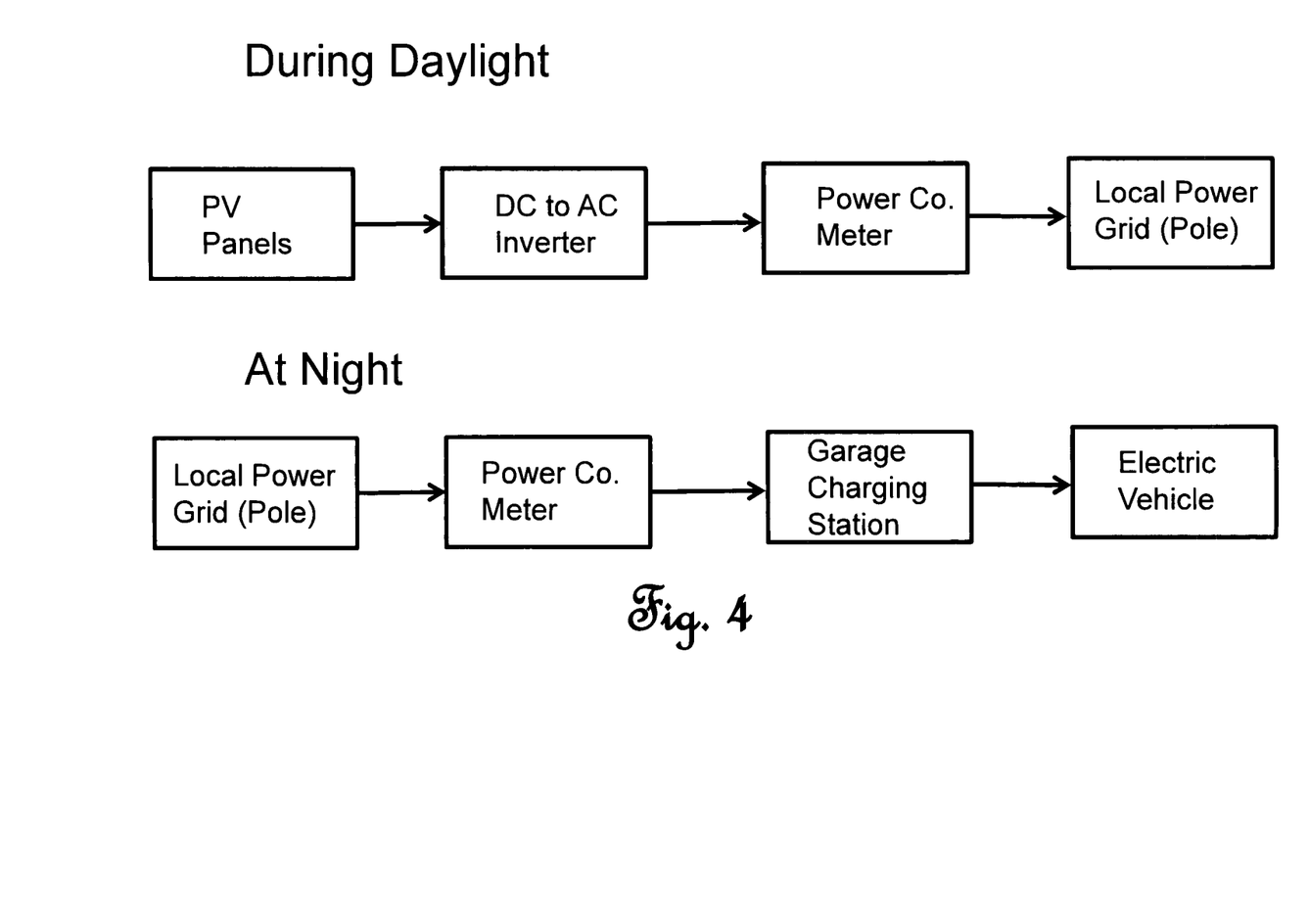
FIG. 4 shows block diagrams of the path of electricity generated and consumed in a dwelling according to some embodiments of the present disclosure.

Thus, in some embodiments, as shown in the block diagrams of FIG. 4, electricity is generated during daylight hours as ambient conditions permit, by virtue of the presence of the photovoltaic cells 11 on the roof surface 3 of a dwelling according to the disclosure. This electricity is converted to AC and "sold" to a power company via a grid-tie network. During night time hours, an electric vehicle is charged as desired, for its use the following day, using electrical power supplied by the power company. In other embodiments, the electrical vehicle is re-charged during daylight hours, directly from the photovoltaic cells' output in real-time.

According to the aforesaid scheme of events, a dwelling according to the disclosure is enabled to be a zero-$CO_2$ emissions dwelling when the ratio of electrical generation capacity to usage is greater than unity. In some embodiments of a dwelling according to the disclosure, the ratio of electrical generation capacity to usage is greater than unity. In some embodiments of a dwelling according to the disclosure, the ratio of electrical generation capacity to usage is about 0.9. In some embodiments of a dwelling according to the disclosure, the ratio of electrical generation capacity to usage is about 0.8.

Generally speaking, in all embodiments of a dwelling according to the disclosure, the ratio of electrical generation capacity to usage is greater than about 0.95.

A dwelling according to this disclosure is constructed from efficient, renewable building and finishing materials. In this context, "renewable" means: natural, mined, manufactured and other processed materials that do not deplete the forests, or cause unnecessary pollution. Examples of renewable building materials employed in a dwelling according to this disclosure include those selected from the group consisting of: renewable wood, glass, masonry, aluminum, steel (including roof and beams), cement-fiber siding, vinyl, and other plastics. Examples of renewable building materials employed in a dwelling according to this disclosure include steel beams.

A dwelling according to the disclosure is constructed using standard dwelling-construction techniques, except for factory manufacture of major elements. For instances in which a municipal sewer connection is not available at a location at which it is desired to construct a dwelling according to this disclosure, a septic system is to be employed for disposal of wastes. A dwelling according to some embodiments of this disclosure is serviced by an advanced split septic system. An advanced split septic system is one which separates the easily re-usable "grey water" (water from drains other than toilets) for minimal treatment for local irrigation. Toilet sewage will receive more thorough treatment.

According to some embodiments of the disclosure, the toilets present in a dwelling as provided herein are of the low-flush variety. Low-flush in this context means toilets which use less than 1.6 gallons per flush.

Figure 5:
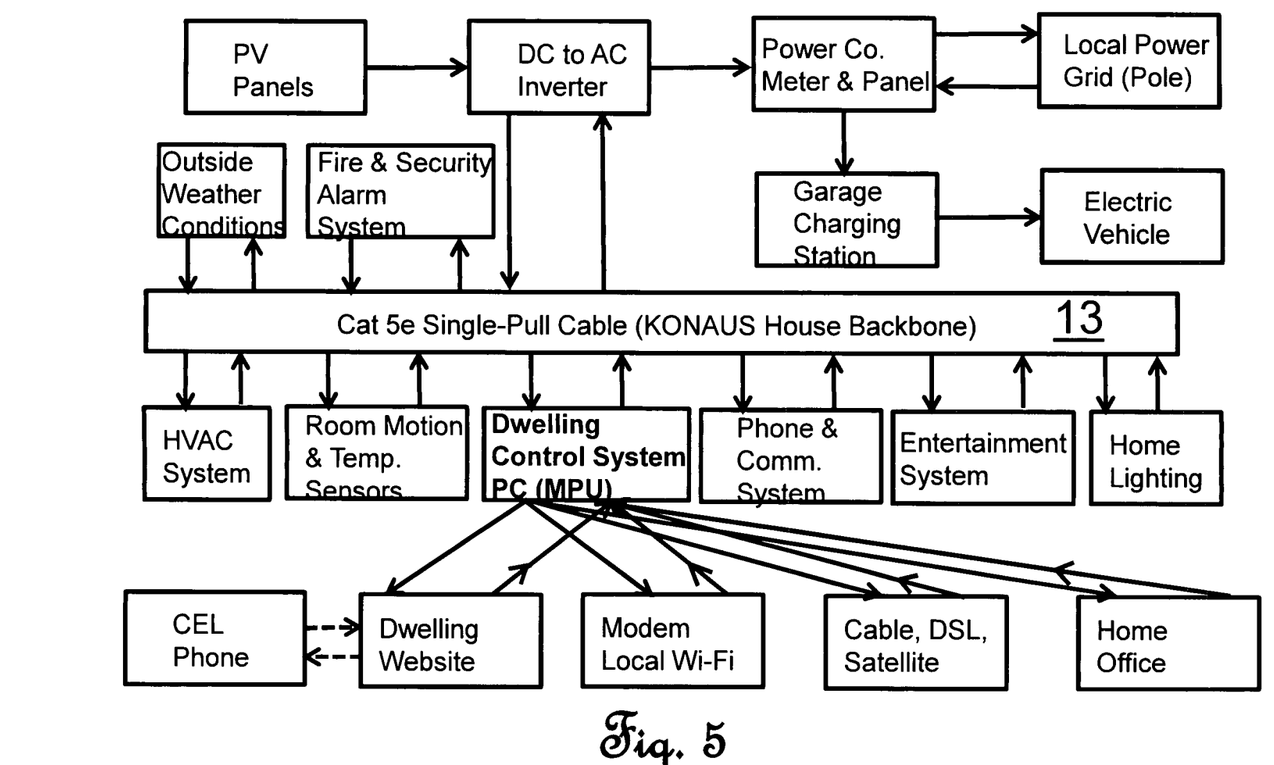
FIG. 5 is a schematic diagram illustrating an integrated control system according to some embodiments of the present disclosure.

A dwelling according to some embodiments of the disclosure includes a control system including hard wiring disposed throughout locations deemed desirable on a case-by-case basis, i.e., the control system is customizable. As shown schematically in FIG. 5, such pre-wiring includes wiring to cooperatively connect various systems and electronic implements with one another. The embodiment illustrated schematically in FIG. 5 shows a main dwelling backbone cable 13, which in some embodiments is a Cat-5e network cable. However, other functionally-equivalent cables known to those skilled in the art are also useful herein, including without limitation Cat 6 cables. The backbone cable 13 is typically routed through walls, through attics, etc. as is generally known in the art for wiring in dwellings. At various locations along the backbone cable there are connected thereto a wide variety of systems and devices (collectively "functional devices"), which include without limitation: inputs from an outside weather station, a fire alarm system for the dwelling, a security alarm system for the dwelling, a power inverter (either or both of grid-tie and non-grid-tie types), a climate control system (which is optionally electrically-powered, or powered by natural gas), motion sensors present in various selected rooms of the dwelling, temperature sensors present in various selected rooms of the dwelling, a telephone system, dwelling lighting, an entertainment system (which optionally includes video and sound equipment), office equipment, and a dwelling control system, which dwelling control system comprises a microprocessor having inputs and outputs.

Figure 6:
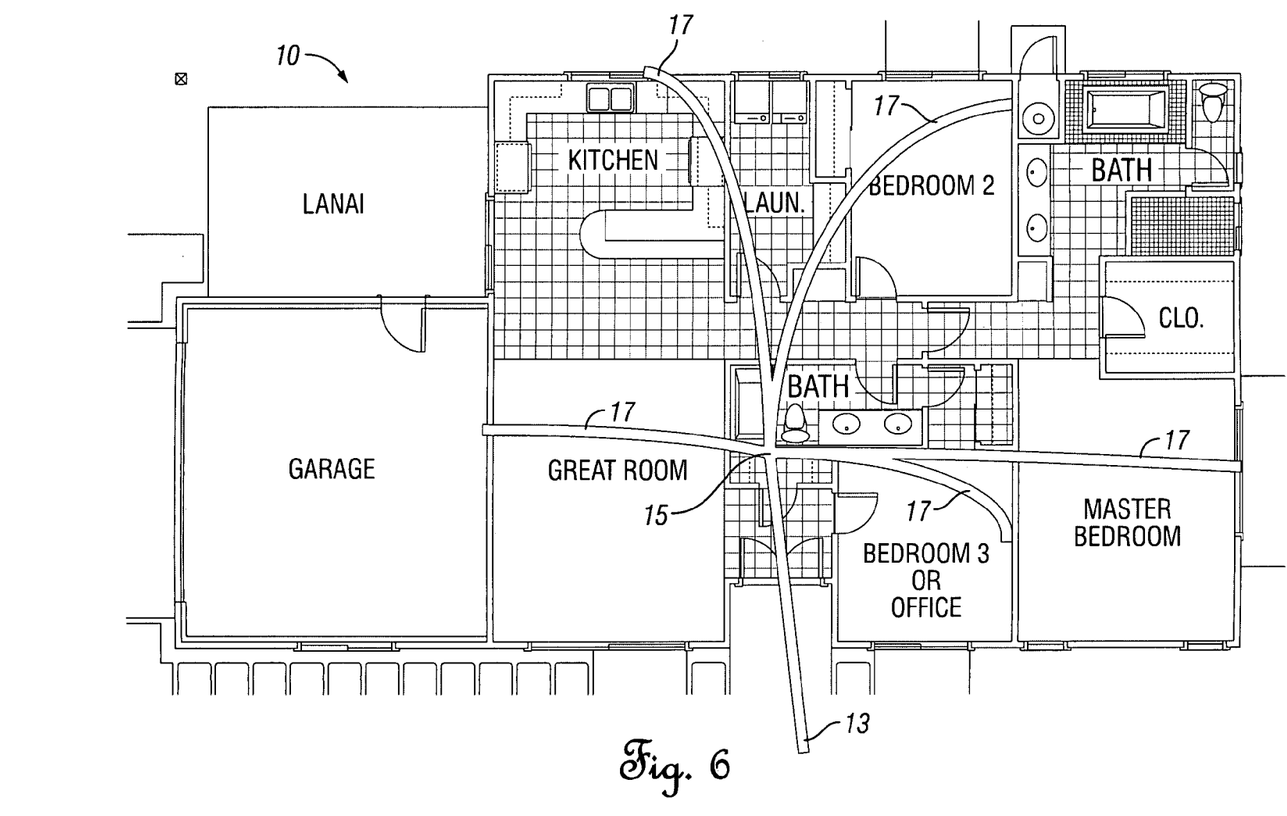
FIG. 6 is an overhead illustration of the distribution of branches of a backbone cable throughout various rooms of a dwelling according to one embodiment of the disclosure.

FIG. 6 is an overhead illustration of the distribution of branches of a backbone cable 13 throughout various rooms of a dwelling 10 according to one embodiment of the disclosure. Backbone cable 13 enters the dwelling 10 at backbone cable entrance 15, in like fashion as wiring from exterior of a dwelling is supplied to the interior of a dwelling according to means known in the art. In the interior of dwelling 10, backbone cable 13 comprises several backbone cable branches 17 which provide access to the backbone cable in various rooms or locations within the dwelling, as desired. Thus, each of the ends of branches 17 are in electrical communication with one another, as was shown and described in reference to FIG. 4. The end of the backbone cable 13 which is exterior to the dwelling is in different embodiments connected to any one or more than one of: a cable television network, a telephone DSL system, a satellite system, or an "over the air" local system.

In some embodiments the dwelling control system is a personal computer, including without limitation those having a LINUX® operating system, a WINDOWS® operating system, and a Unix-based operating system and a Mac OS operating system. The dwelling control system is operatively connected to the backbone cable sufficiently to receive input signals from other systems and/or devices which are themselves connected to the backbone cable. In addition, the dwelling control system is operatively connected to the backbone cable sufficiently to output signals to other systems and/or devices which are themselves connected to the backbone cable. Thus, in general, the dwelling control system is configured to receive one or more than one inputs from device(s) and/or system(s) operatively connected to the backbone cable, and to transmit one or more than one outputs from the dwelling control system to one or more than one device(s) and/or system(s) operatively connected to the backbone cable.

The dwelling control system is itself operatively connected to a plurality of systems and/or devices, which systems and/or devices are not themselves directly operatively connected to the backbone cable of a dwelling according to the disclosure. Such devices and/or systems include one or more than one of those selected from the group consisting of: a website on a computer network (which network in some embodiments comprises the internet), a local Wi-fi modem (including Residential Gateway devices), a cable television network connection, a DSL computer network connection, a satellite network communications connection, and a home office connection, wherein the home office connection includes the internet. For embodiments in which the dwelling control system is operatively connected to a website on a computer network which is devoted solely to the dwelling itself, a cellular telephone is also operatively connected to the dwelling website for the purpose of monitoring and control of the dwellings' systems.

By such connection and configuration of the various devices and systems, in one non-limiting example, the dwelling control system receives signals from the outside weather station, which weather station is capable of outputting signals indicative of temperature, humidity, wind speed, barometric pressure, and solar intensity. In some embodiments, in response to signals received from the outside weather station, and temperature sensors disposed about the interior of the dwelling, the dwelling control system outputs signals to the climate control system, to adjust or maintain the temperature inside various locations of the dwelling.

By such connection and configuration of the various devices and systems, in one non-limiting example, the dwelling control system receives signals from the fire alarm system of the dwelling, which fire alarm system is capable of outputting signals indicative of the presence of smoke and/or fire at a location within the dwelling. In some embodiments, in response to signals received from the fire alarm system of the dwelling, the dwelling control system outputs signals to the dwelling's owner or manager, a contracted dwelling monitoring service, or a fire department for the purpose of responding to the alarm.

By such connection and configuration of the various devices and systems, in one non-limiting example, the dwelling control system receives signals from the security alarm system of the dwelling, which security alarm system is capable of outputting signals indicative of the presence of a breach of security, including a break-in by a burglar at a location within the dwelling. In some embodiments, in response to signals received from the security alarm system of the dwelling, the dwelling control system outputs signals to the dwelling's owner or manager, a contracted dwelling monitoring service, or a police department for the purpose of responding to the alarm.

By such connection and configuration of the various devices and systems, in one non-limiting example, the dwelling control system receives signals from the climate control system of the dwelling, which climate control system is capable of outputting signals indicative of the thermostat control. In some embodiments, in response to signals received from the climate control system of the dwelling, the dwelling control system outputs signals to the dwellings' heating and cooling system, for the purpose of minimizing energy usage.

By such connection and configuration of the various devices and systems, in one non-limiting example, the dwelling control system receives signals from the telephone system of the dwelling, which telephone system is capable of outputting signals relating to secure inputs from the dwellings' owner or manager. In some embodiments, in response to signals received from the telephone system of the dwelling, the dwelling control system outputs signals to the dwellings' climate control system, for the purpose of energy conservation, or in preparation for the dwelling's occupants return to the dwelling.

By such connection and configuration of the various devices and systems, in one non-limiting example, the dwelling control system receives signals from the dwelling lighting system, which dwelling lighting system is capable of outputting signals indicative of unnecessary illumination. In some embodiments, in response to signals received from the dwelling lighting system, the dwelling control system outputs signals to selectively turn on or turn off lighting, for the purpose of saving energy or providing additional security.

By such connection and configuration of the various devices and systems, in one non-limiting example, the dwelling control system receives signals from the dwelling entertainment system, which dwelling entertainment system is capable of being remotely controlled. In some embodiments, in response to signals received from the dwelling entertainment system, the dwelling control system outputs signals to store specified programming, for the purpose of presentation at a later time.

By such connection and configuration of the various devices and systems, in one non-limiting example, the dwelling control system receives signals from motion sensors present in various selected rooms or areas of the dwelling, which motion sensors are capable of outputting signals indicative of moving persons present within the dwelling. In some embodiments, in response to signals received from the motion sensors, the dwelling control system outputs signals to the climate control system, for the purpose of providing "on demand" heating or cooling of the dwellings' interior. In some embodiments, the motion sensors are infrared-based, and the same sensors which are employed to detect motion are also used in the climate control system for energy conservation.

By such connection and configuration of the various devices and systems, in one non-limiting example, the dwelling control system receives signals from temperature sensors present in various selected rooms or areas of the dwelling, which temperature sensors are capable of outputting signals indicative of the ambient temperature at their location. In some embodiments, in response to signals received from the temperature sensors, the dwelling control system outputs signals to the alarm system, for the purpose of dwelling security.

In some embodiments, a dwelling according to this disclosure has its own secure internet website. Through such a website, complete remote monitoring and control of security, fire alarm, climate control, lighting, entertainment control is enabled by the dwellings' software control and the structured backbone cabling in the structure.

In some embodiments, backbone cable 13 is terminated at a Residential Gateway, which is a modem, one example being EPC3925 EuroDOCSIS 3 wireless residential gateway, available from Cisco Corporation. Having a personal computer connected via a USB or other suitable connection to the backbone cable 13 enables many software functions, based on available inexpensive software from sources which include without limitation: Cisco Corporation and several other companies known to those skilled in this art. In some embodiments, as the dwelling is monitored via the Residential Gateway, the dwelling's system according to this disclosure is able to send a text message to the dwelling's owner via their cellphone to alert the dwellings' owner if anything regarding the dwelling is amiss, for example in the event of detection of an intruder or fire. Moreover, the dwelling's owner can activate, deactivate, or adjust systems and/or devices which are connected to the backbone cable 13, such as the climate control system, or the entertainment system when, for example the dwellings' owner desires to cause a DVR unit to record a televised event or show. In some embodiments, the Residential Gateway monitors energy usage of the dwelling, including the electric vehicle. The energy usage is determined via microprocessor for anomalies. In some embodiments the Residential Gateway alerts the dwellings' owner when a fault exists in the dwelling, such as a non-functional or faulty photovoltaic panel. In some embodiments, a system according to the disclosure enables the dwellings' owner to lock or unlock the dwelling remotely via their cellphone and the Residential Gateway. In some embodiments a system according to the disclosure turns on or off the attic or house outside air ventilation, in response to ambient conditions.

In some embodiments the Residential Gateway functions as a Thin Client, and access an off-site server for instructions and information, for example in some embodiments the Residential Gateway accesses weather data from the NOAA website or any other suitable network route.

In some embodiments, a system according to the disclosure enables the dwellings' owner to transmit, via the Residential Gateway, health information to a recipient outside the dwelling, which can be a doctor, medical technician, or medical facility, wherein the data is derived from a Toto™ bio-toilet, the data including body weight, blood pressure, temperature, and urine data.

A beneficial financing plan is desirable in order to provide a business model which facilitates adoption of dwellings according to this disclosure into the general marketplace. In one embodiment, the photovoltaic solar electric system of a dwelling as provided herein is furnished at no initial cost to the dwellings' owner. The system is funded by an "energy environmental loan" using the dwelling itself as collateral. All available environmental government and utility incentives offered by government entities and utilities providers will be applied to reduce the principal amount of the loan. In one embodiment, the owner of the dwelling is required by contract to purchase the electricity they consume from the dwelling photovoltaic system at a rate equal to about 90% of the utility electric rate at the time of the "closing" of the dwellings' sale. The rate is locked-in and will not increase over time, even though the local utility rate is anticipated to increase, due to market forces including inflation, and electricity production, service, and delivery costs. The monies paid by the dwellings' owner (including their successors or assigns) is applied towards paying off the construction loan of the photovoltaic solar electric system of the dwelling. Various embodiments provided for contract terms to specify and enable that the loan for the photovoltaic system is to be retired at any amount of time between about seven years and about fifteen years from the time of the "closing" of the dwellings' sale, depending upon the size of the photovoltaic system, consumption of electricity, the cost per kilowatt hour (or any other functionally-equivalent measure) of electricity, and local weather conditions. After the loan is retired, the photovoltaic solar electric system is totally owned by the dwellings' owner. This is in contrast to prior art systems, the ownership of which is typically retained by the systems' provider and is rented or leased to the dwellings' owner or occupant.

Another aspect of this disclosure concerns processes associated with providing a dwelling according to the invention. In an exemplary process, the geographical location where the dwelling is to be constructed is first determined. From this location, the angle of roof surface 3 is first determined. Subsequently, the amount and type of insulation to be used in the dwelling is determined by recommendations from Energy Star® and other environmental agencies. The expected efficiency of the photovoltaic panels 11 are determined based on the roof surface angle, average number of sunny days at the location of the dwellings' construction, and efficiency of the selected photovoltaic panels themselves:

The dwelling itself is next defined, by its built-in efficiency, intrinsic energy independence and conservation, and designed-in intelligence.

Subsequently, the appliances which are to be present in the dwelling are identified, and their energy consumption calculated based on their wattage ratings and typical use patterns.

A decision is subsequently made concerning whether the dwelling is to have its garage space to be equipped with a station for charging an electrically-propelled vehicle. For cases in which one is to be present, its power demand is determined using selected or calculated amounts of vehicle use or travel over time, coupled with its power requirements on a per distance basis.

Knowledge of the foregoing then enables the total energy requirements of the dwelling to be determined, which energy requirements are subsequently used to determine the necessary size/capacity of the photovoltaic panels or an array of same, for embodiments in which the dwelling is to be 100% electrically self-sufficient. For embodiments in which an auxiliary power source is to be used, such as an on-site hydrocarbon fueled electrical generator, the generator and photovoltaic panels can be each adjusted in capacity to provide a desired blend of each of same providing a selected fraction of the total electrical power needs of the dwelling. Determination of the foregoing enables a plan to be submitted to the dwellings' proposed owner for consideration, which consideration includes in some embodiments a financing plan within the disclosure stated earlier herein.

Various features described in reference to embodiments of a dwelling according to the disclosure are implementable using known computer systems and software available in the marketplace. One example of such software is Schlage LiNK™ software available from the Schlage division of Ingersoll-Rand plc. Another example of such software is PowerHome2™ available from PowerHome Automation LLC. Examples of hardware and software useful in accordance with the present disclosure is sold under the Motorola Homesight Gateway trademark, sold in small, medium, and large versions.

Consideration must be given to the fact that although this invention has been described and disclosed in relation to certain preferred embodiments, equivalent modifications and alterations thereof may become apparent to persons of ordinary skill in this art after reading and understanding the teachings of this specification, drawings, and the claims appended hereto. The present disclosure includes subject matter defined by any combinations of any one or more of the features described in reference to one or more than one embodiment(s) with any one or more of any other features described in reference to one or more than one other embodiments set forth in this disclosure. These combinations include the incorporation of the features and/or limitations of any dependent claim, singly or in combination with features and/or limitations of any one or more of the other dependent claims, with features and/or limitations of any one or more of the independent claims, with the remaining dependent claims in their original text being read and applied to any independent claims so modified. These combinations also include combination of the features and/or limitations of one or more of the independent claims with features and/or limitations of another independent claims to arrive at a modified independent claim, with the remaining dependent claims in their original text or as modified per the foregoing, being read and applied to any independent claim so modified. The present invention has been disclosed and claimed with the intent to cover modifications and alterations that achieve substantially the same result as herein taught using substantially the same or similar structures, being limited only by the scope of the claims which follow.

The invention claimed is:

1. A dwelling comprising:
a) an exterior wall, having a bottom portion and a top portion, said exterior wall defining a dwelling perimeter, and wherein said top portions of said wall are substantially on the same plane about said perimeter so as to define a horizontal;
b) a roof disposed upon and attached to said top portion of said wall, said roof having a pitch that forms an angle with respect to said horizontal, said angle being any angle in the range of between about fifteen degrees and about thirty degrees, based on geographical latitude according to the formula:

roof angle=[(Latitude on Earth's surface)×0.75]+3 degrees;

c) a plurality of photovoltaic panels attached to said roof, said photovoltaic panels having an output that provides a source of DC electricity;
d) a plurality of interior walls, configured to define separate rooms within said dwelling;
e) a backbone cable present within said dwelling, said backbone cable having a plurality of branches, said branches having ends that are accessible in said separate rooms;
f) a plurality of functional devices, comprising independently at least any two devices selected from the group consisting of: an outside weather station, a fire alarm system, a security alarm system, a power inverter, a climate control system, motion sensors, temperature sensors, a telephone system, dwelling lighting, an entertainment system, and a DC to AC current inverter, said functional devices being connected to and in electrical communication with said backbone cable, and being configured to receive inputs from, and optionally provide outputs to, said backbone cable; and
g) a microprocessor having input and output ports, connected to said backbone cable in effective electrical communication therewith, and configured to receive inputs and provide outputs to said functional devices.

2. A dwelling according to claim 1, wherein said current inverter has an input and an output, said input of said current inverter being connected to said output of said photovoltaic panels, and wherein said output of said current inverter is selectively connectable to the grid of a power company.

3. A dwelling according to claim 2, further comprising storage space for an electric vehicle, and a charging station for said electric vehicle, said charging station being electrically connected to said grid.

4. A dwelling according to claim 1, wherein said backbone cable is a cable of the type selected from the group consisting of: Cat 5e network cables, Cat 6 network cables, RG6 network cables and fiberoptic cables, including any combinations thereof.

5. A dwelling according to claim 1, further comprising at least one item selected from the group consisting of: a network website having a cellphone interface, a local wi-fi modem, a cable television feed, a DSL network feed, a satellite feed, and an article of office equipment interactively connect to said ports of said microprocessor.

6. A dwelling according to claim 5, wherein said climate control system is present and wherein said microprocessor is configured to adjust the temperature inside a room of said dwelling responsive to an input selected from the group consisting of: the ambient temperature exterior to said dwelling, a temperature sensor present in a room of said dwelling, and a command provided by a cellphone through said network website.

7. A dwelling according to claim 5, wherein said microprocessor is configured to cause an action selected from the group consisting of: activation of said entertainment system, actuating a lock on a door of said dwelling, control of the climate control system, and control of lighting within the dwelling, responsive to a command given by a user via a cellphone through said network website.

8. A dwelling according to claim 5, wherein said microprocessor is configured to cause transmission of a signal to the cellphone of a user responsive to a condition present in said dwelling, via said network website.

9. A dwelling according to claim 8, wherein said condition is selected from the group consisting of: a security breach in the dwelling, a fire in the dwelling, and any other situation considered as an emergency.

10. A dwelling according to claim 5, wherein said security alarm system is present and is activated in response to a motion sensor present in a room within said dwelling.

11. A dwelling according to claim 1, wherein said roof comprises four planar surfaces.

12. A dwelling according to claim 1, further comprising a cistern system configured to receive, store, and deliver rainwater from said roof.

* * * * *